United States Patent [19]

Koch et al.

[11] 3,980,257
[45] Sept. 14, 1976

[54] EXTENSIBLE-RETRACTABLE WING

[75] Inventors: Leland C. Koch, Ferguson; Warren P. Crossley, Affton; Donald M. Scheller, Ballwin, all of Mo.

[73] Assignee: The United States of America as represented by the Secretary of the Navy, Washington, D.C.

[22] Filed: Aug. 16, 1974

[21] Appl. No.: 498,010

Related U.S. Application Data

[63] Continuation-in-part of Ser. No. 360,226, May 14, 1973, abandoned.

[52] U.S. Cl. .................................. 244/43; 244/46
[51] Int. Cl.² .......................................... B64C 3/54
[58] Field of Search .................. 244/43, 46, 47, 48, 244/49

[56] References Cited
UNITED STATES PATENTS

| | | | |
|---|---|---|---|
| 1,841,936 | 1/1932 | Bruns | 244/43 |
| 1,945,254 | 1/1934 | Bittner | 244/47 |
| 1,998,148 | 4/1935 | Vieriu | 244/49 |
| 2,122,214 | 6/1938 | Reid | 244/43 |
| 2,162,066 | 6/1939 | Asis | 244/49 |
| 2,231,524 | 2/1941 | Martin | 244/43 |
| 2,260,316 | 10/1941 | Harris | 244/43 |
| 2,294,367 | 9/1942 | Fleming | 244/43 |
| 2,420,433 | 5/1947 | Kraaymer | 244/43 |
| 2,858,091 | 10/1958 | Kapenkin | 244/43 |
| 3,083,935 | 4/1963 | Piasecki | 244/43 |
| 3,333,792 | 8/1967 | Alvarez-Calderon | 244/43 |

FOREIGN PATENTS OR APPLICATIONS

| | | | |
|---|---|---|---|
| 605,075 | 7/1948 | United Kingdom | 244/43 |
| 669,175 | 3/1952 | United Kingdom | 244/43 |
| 153,348 | 11/1920 | United Kingdom | 244/49 |

*Primary Examiner*—Trygve M. Blix
*Assistant Examiner*—Galen L. Barefoot
*Attorney, Agent, or Firm*—R. Sciascia; R. Beers; S. Sheinbein

[57] ABSTRACT

Two wing semi-spans of unitary construction are mounted on an aircraft fuselage. Screwjacks mounted in the fuselage extend and retract each semi-span while maintaining the wing sweep angles constant. Pivoting struts and carriage blocks are employed to support the extensible semi-spans. Rollers connected to the carriage blocks are constrained to follow tracks mounted in the fuselage, providing support at the inboard end of each semi-span.

13 Claims, 5 Drawing Figures

U.S. Patent  Sept. 14, 1976  3,980,257
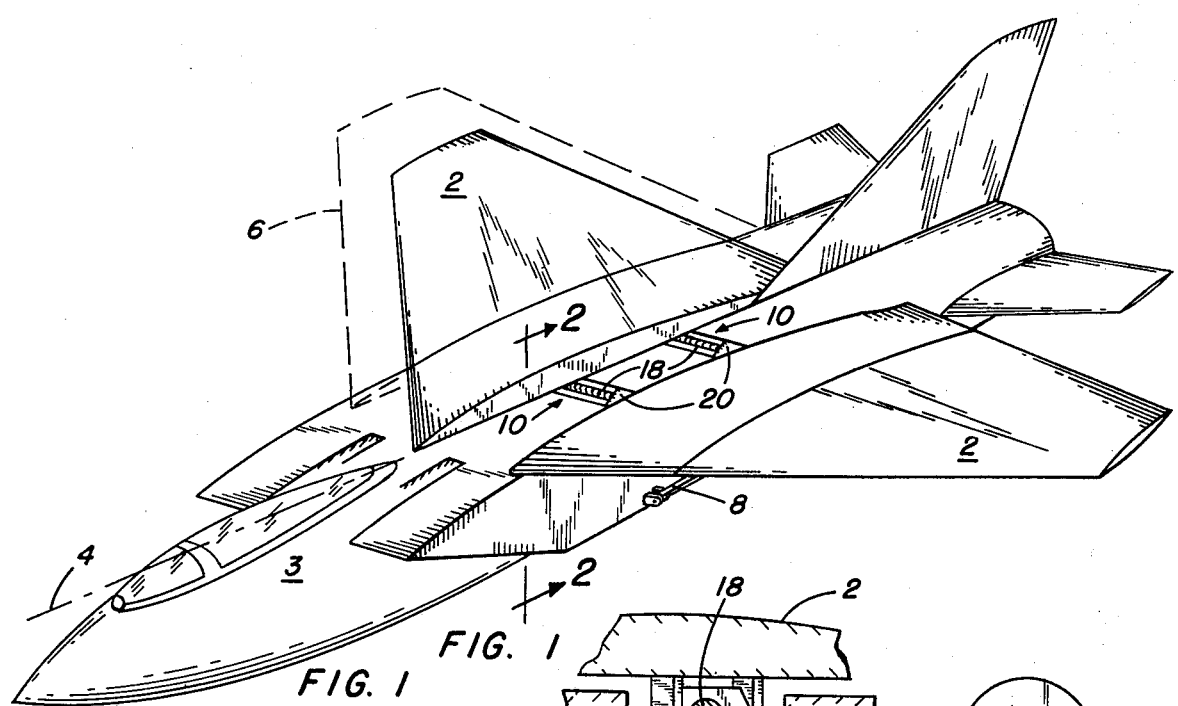
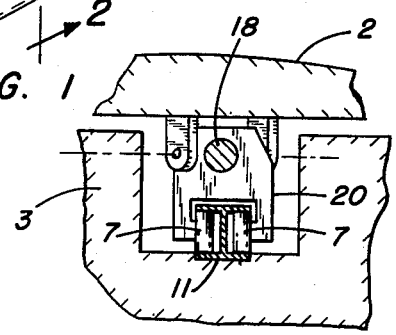
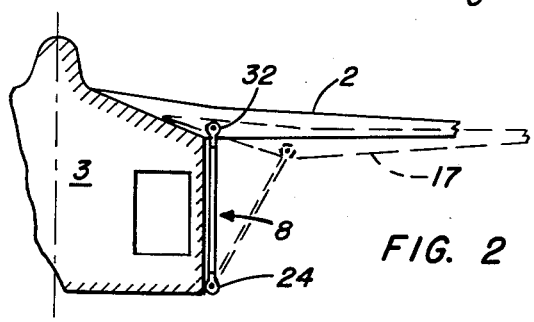
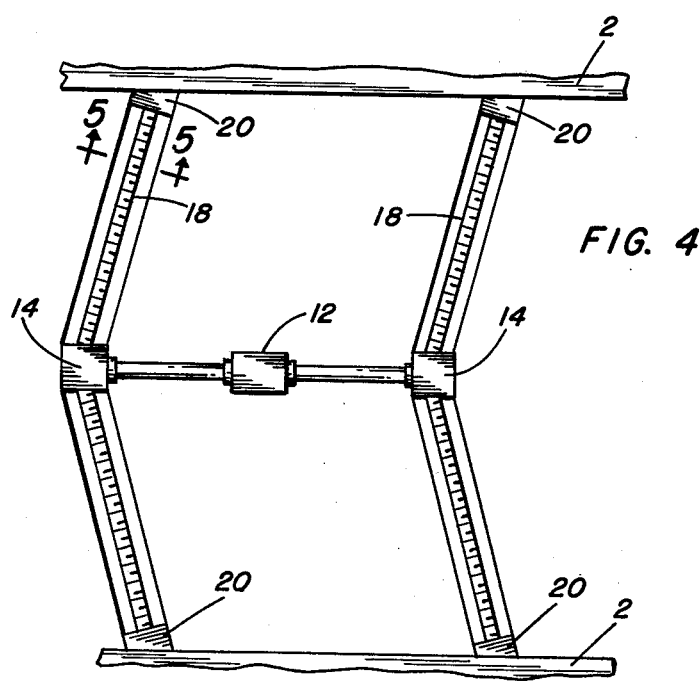
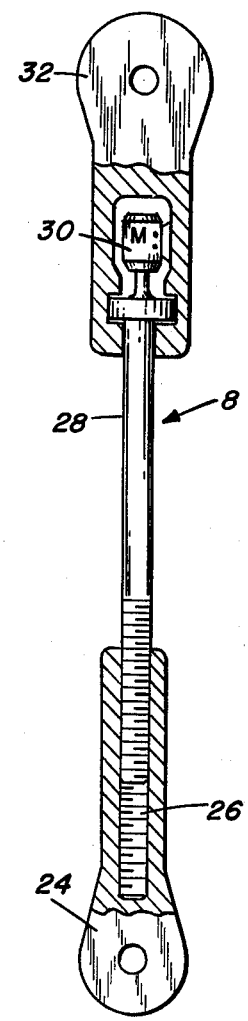

EXTENSIBLE-RETRACTABLE WING

This is a continuation-in-part of application Ser. No. 360,226, filed May 14, 1973, now abandoned.

BACKGROUND OF THE INVENTION

The present invention relates generally to variable geometry aircraft and more particularly to an extensible and retractable wing for aircraft.

In the field of aeronautics those concerned with improving the flight characteristics of aircraft have employed variable sweep wings, telescoping wings, and folded wing tip designs. These arrangements allow the aircraft configuration to be designed for high-speed, cruise flight, while still providing satisfactory landing, take-off, and maneuvering characteristics at lower speeds of the aircraft.

Some extensible wing designs employed in the past used semi-spans which consisted of a main inner wing section permanently affixed to the fuselage and a retractable wing telescopically mounted in the main inner wing. These cantilevered wing constructions produced extremely high maximum loads at the movable wing root for extended positions of the wings. Moreover, extensive gearing arrangements were required to be incorporated into the main wings to support the separate retractable wings. These necessities required a relatively heavy and complex mechanical structure.

In the case of a variable geometry aircraft in which the wing sweep angle is varied, high wing loads also exist. In addition, variation of the sweep angle causes the neutral point of the aircraft to move and creates certain aerodynamic problems.

SUMMARY OF THE INVENTION

By employing a movable, unitary semi-span, the present invention overcomes the problems associated with the telescoping and variable sweep wing configurations, employed in the past. Screwjacks mounted in the fuselage of the airplane control the extension and retraction of the unitary semi-spans which overlap a portion of the fuselage when retracted. Struts and rollers on tracks are utilized to support the wing in all positions, the struts reducing maximum wing bending moments, torsion, and shear loads for wing extended or retracted positions. By increasing wing area without varying the sweep angle of the wings, the present configuration avoids the aerodynamic problems associated with a variable sweep angle configuration.

OBJECTS OF THE INVENTION

An object of the present invention is to allow an increase or decrease in an aircraft's wing area for improved maneuvering characteristics at various speeds.

Another object is to reduce landing and take-off speeds by increasing aircraft wing area.

A further object of the invention is to improve ride qualities of an aircraft during high speed, low altitude flight by reducing wing area.

Another object is to distribute the wing loads over a greater portion of the fuselage.

Still another object is to utilize a unitary semi-span construction on an extensible-wing aircraft.

A still further object is to allow for an increase or decrease in the wing area while maintaining the sweep angle of the wings constant.

Another object is to reduce the wing maximum bending moments, torsion and shear loads.

Other objects, advantages, and novel features of the present invention will become apparent from the following detailed description of the invention when considered in conjunction with the accompanying drawings.

BRIEF DESCRIPTION OF THE DRAWINGS

FIG. 1 is a schematic of an aircraft employing the present invention;

FIG. 2 is a partial sectional view taken along line 2—2 of FIG. 1 showing a strut;

FIG. 3 is a partial sectional view of an alternate feature of the invention;

FIG. 4 is a view of the extending and retracting portion of the invention; and

FIG. 5 is a view taken along lines 5—5 of FIG. 4 showing the track and rollers on which the carriage blocks are mounted.

DESCRIPTION OF THE PREFERRED EMBODIMENT

FIG. 1, which illustrates a preferred embodiment of an aircraft employing the extensible-retractable, wing construction of the present invention, shows an aircraft fuselage 3 having two wing semi-spans 2 movably mounted thereon. The semi-spans 2 are each a unitary or one-piece construction. In FIG. 1 the wing is depicted in a high-wing configuration for purposes of illustration. The semi-spans 2 together form a wing which provides substantially all the lift for the aircraft.

Also for purposes of illustration, the semi-span 2 in the foreground of FIG. 1 is shown in its extended position, while the semi-span 2 in the background is shown in its retracted position. The dotted lines 6 illustrate the position of the semi-span 2 in the background of FIG. 1 when extended. Motors and gears depicted in FIG. 4 operate the screwjacks 18. The wing carriage blocks 20 on the screwjacks 18 are connected to each of the semi-spans 2 and retract and extend the semi-spans when the threaded, screwjack rods 18 are rotated by the motors. As can be seen in FIG. 1, each of the semi-spans 2 is retracted to the aircraft centerline 4 overlapping a portion of the fuselage when in its retracted position. It should be noted that, due to the unitary semi-span wing construction, each semi-span is moved in toto, or as a whole, from one position to another — this type of movement will be referred to hereinafter as "movement as a whole" and the wing semi-spans will be said to be "movable as a whole."

FIG. 2, better illustrates the use of struts 8 to support the wing semi-span 2. The struts 8 are pivotally mounted to the fuselage at bearing member 24 and the semi-spans at bearing member 32. Although only one strut is shown, an equal number on each side of the fuselage may be employed. The dotted line 17 in FIG. 2 illustrates the semi-span 2 in the extended position. If the struts 8 are non-extendable, the wing might move downward as well as outward when extended, depending on aircraft gemetry.

FIG. 3 illustrates an extensible strut 8 which could be employed to allow for extension of the semi-spans without any downward movement. The extensible strut has bearing members 24 and 32. Bearing member 32 also includes a motor 30 which is actuated upon wing extension or retraction to increase or decrease the length of the strut member 28 between bearing members 24 and 32 as appropriate.

FIG. 4 better illustrates the preferred mounting of the screwjacks 18. A motor 12 operates the screwjacks 18 through gear housings 14. The screwjacks operate simultaneously to extend or retract the semi-spans. Any suitable motors and gears may be chosen to operate the extensible semi-spans.

FIG. 5 illustrates the connection of one of the carriage blocks 20 to the fuselage 3. A track 11 is rigidly affixed to the fuselage by suitable means such as welding. The rollers 7 connected to the carriage block 20 follow the track 11 as the semi-spans 2 are simultaneously extended and retracted. The remaining carriage blocks are connected to the wing in the same manner.

Obviously many modifications and variations of the present invention are possible in light of the above teachings. It is therefore to be understood that, within the scope of the appended claims, the invention may be practiced otherwise than as specifically described.

What is claimed is:

1. An aircraft comprising:
    a fuselage having an outer configuration that is incapable of producing a substantial amount of aerodynamic lift;
    two wing semi-spans, each of unitary construction, movably mounted on said fuselage, each semi-span having an inboard portion overlapping a portion of the fuselage and an outboard portion extending beyond the fuselage when the semi-spans are in their fully retracted position said moveable wing semi-spans together forming a wing which provides substantially all the lift for the aircraft; and
    means for selectively extending and returning said semi-spans as a whole from and to their fully retracted position substantially transversely to the aircraft longitudinal axis, whereby the amount of each semi-span overlapping said fuselage is varied without varying wing sweep-angle, said inboard portion of each semi-span still overlapping a portion of said fuselage in all positions of extension.

2. The aircraft of claim 1 wherein the extending and returning means comprises:
    screwjacks mounted entirely within said fuselage and connected to the semi-spans; and
    means for actuating said screwjacks mounted in said fuselage.

3. An aircraft comprising:
    a fuselage;
    two wing semi-spans, each of unitary construction, movably mounted on said fuselage, each semi-span being entirely outside of said fuselage and having an inboard portion overlapping a portion of said fuselage in a first fully retracted position contiguous to each other and an outboard portion extending beyond said fuselage in said first fully retracted position said moveable wing semi-spans together form a wing which provides substantially all the lift for the aircraft; and
    means for selectively extending and returning said semi-spans as a whole from and to their fully retracted position substantially transversely to the aircraft longitudinal axis, whereby the amount of each semi-span overlapping said fuselage is varied without varying wing sweep-angle, said inboard portion of each semi-span still overlapping a portion of said fuselage in all positions of extension.

4. The aircraft of claim 3 wherein the semi-spans overlap the top of said fuselage.

5. An aircraft comprising:
    a fuselage having an outer configuration that is incapable of producing a substantial amount of aerodynamic lift;
    two wing semi-spans, each of unitary construction, movably mounted on said fuselage, each semi-span having an inboard portion overlapping a portion of the fuselage and an outboard portion extending beyond the fuselage when the semi-spans are in their fully retracted position;
    means for selectively extending and returning said semi-spans as a whole from and to their fully retracted position substantially transversely to the aircraft longitudinal axis, said means having screwjacks mounted entirely within said fuselage and connected to the semi-spans and having means for actuating said screwjacks mounted in said fuselage, whereby the amount of each semi-span overlapping said fuselage is varied without varying wing sweep-angle, said inboard portion of each semi-span still overlapping a portion of said fuselage in all positions of extension;
    a plurality of carriage blocks connecting the inboard end of each semi-span to said screwjacks;
    tracks mounted entirely within said fuselage; and
    rollers connected to said carriage blocks and constrained to follow said tracks thereby supporting the inboard ends of said semi-spans.

6. The aircraft of claim 5 further comprising:
    one strut having a unitary member, said member being pivotally connected at one end to one side of said fuselage, the other end of said member being pivotally connected to the bottom of one semi-span; and
    another strut having a second unitary member, said second unitary member having one end pivotally connected to the other side of said fuselage and the other end of said second unitary member being pivotally connected to the bottom of the other semi-span.

7. The aircraft of claim 6 wherein both struts include means for extending and retracting themselves upon movement of said semi-spans.

8. The aircraft of claim 7 wherein said extending and retracting means comprises:
    first bearing members pivotally connected to each side of the fuselage, each bearing member having a threaded recess therein, each recess threadedly engaging one of the ends of each unitary member;
    second bearing members pivotally connected to the bottom of each semi-span; and
    motor means mounted within said second bearing members and connected to the other ends of each unitary member for rotating said unitary members as said semi-spans extend and return from and to their fully retracted position.

9. An aircraft comprising:
    a fuselage;
    two wing semi-spans, each of unitary construction, movably mounted on said fuselage, each semi-span being entirely outside of said fuselage and having an inboard portion overlapping the top of said fuselage in a first fully retracted position and an outboard portion extending beyond said fuselage in said first fully retracted position; and
    means for selectively extending and returning said semi-spans as a whole from and to their fully retracted position substantially transversely to the aircraft longitudinal axis, said means having screwjacks mounted entirely within said fuselage and connected to said semi-spans and having means for actuating said screwjacks mounted in said fuselage, whereby the amount of each semi-span overlapping said fuselage is varied without varying wing sweep-angle, said inboard portion of each semi-span still overlapping a portion of said fuselage in all positions of extension.

10. The aircraft of claim 9 further comprising:
a plurality of carriage blocks connecting the inboard end of each semi-span to said screwjacks;
tracks mounted in said fuselage; and
rollers connected to said carriage blocks and constrained to follow said tracks thereby supporting the inboard ends of said semi-spans.

11. The aircraft of claim 10 wherein said carriage blocks are mounted on said screwjacks directly above said tracks.

12. The aircraft of claim 10 further comprising:
one strut having a first end pivotally connected to one side of said fuselage and a second end pivotally connected to one semi-span; and
another strut having a first end pivotally connected to the other side of said fuselage and a second end pivotally connected to the other semi-span.

13. The aircraft of claim 12 wherein both struts include means for extending and retracting themselves upon movement of the semi-spans.

* * * * *